United States Patent [19]

Meier

[11] Patent Number: 4,767,632

[45] Date of Patent: Aug. 30, 1988

[54] METHOD FOR THE PREPARATION OF COFFEE

[75] Inventor: Hermann Meier, Döttingen, Switzerland

[73] Assignee: Cafina AG, Hunzenschwil, Switzerland

[21] Appl. No.: 18,606

[22] Filed: Feb. 25, 1987

[30] Foreign Application Priority Data

May 5, 1986 [DE] Fed. Rep. of Germany ....... 3615158

[51] Int. Cl.[4] ................................................. A23F 5/24
[52] U.S. Cl. ...................................... 426/231; 99/280; 99/283
[58] Field of Search .................... 99/280, 283; 426/231

[56] References Cited

U.S. PATENT DOCUMENTS 4,412,481 11/1983 Oota et al. ............................ 99/280
4,484,515 11/1984 Illy .................................... 99/283 X

FOREIGN PATENT DOCUMENTS 2637431 4/1977 Fed. Rep. of Germany ........ 99/280
2053466 7/1978 Fed. Rep. of Germany .
3107549 2/1982 Fed. Rep. of Germany .
WO82/01120 4/1982 PCT Int'l Appl. .

Primary Examiner—Joseph Golian
Attorney, Agent, or Firm—Tarolli, Sundheim & Covell

[57] ABSTRACT

In a coffee brewing apparatus, a milling assembly produces coffee powder which is filled into a brewing chamber. Then the brewing chamber is closed by a displaceable piston in order to exert a preselected pressure on the coffee powder in the brewing chamber, and hot water is forced through the compressed coffee powder. If it is recognized after several subsequent preparation cycles that too much or too less coffee powder has been filled into the brewing chamber, the operation period of the milling assembly is shortened or extended automatically under the influence of a programmed control unit. Simultaneously or additionally, a flow rate detector measures the amount of water flowing through the compressed coffee powder and the control unit measures the time required by the water to pass through the coffee powder in the brewing chamber. If a deviation of the measured time from a reference value is detected, the milling rate is adjusted to produce finer or coarser coffee powder in one of the subsequent preparation cycles. Minor deviations within normal tolerances are ignored.

14 Claims, 3 Drawing Sheets

METHOD FOR THE PREPARATION OF COFFEE

BACKGROUND OF THE INVENTION

1. Field of the Invention

This invention relates to a method for the preparation of coffee by means of a coffee brewing apparatus, particularly by means of a program controlled coffee brewing apparatus which comprises a coffee bean milling assembly, a brewing chamber adapted to receive the coffee powder delivered by the coffee bean milling assembly and having an inlet for the coffee powder as well as a beverage outlet, a piston displaceably mounted above the brewing chamber, driving means to displace the piston from a position remote from the brewing chamber whereby its inlet is open to a position in the interior of the brewing chamber whereby its inlet is closed, and a hot water supply assembly connected to the brewing chamber and adapted to deliver hot water under pressure into the brewing chamber.

With such an apparatus, a coffee beverage is prepared as follows: Coffee beans are milled to coffee powder with a preset rate of milling, and a preset amount of coffee powder is filled into the brewing chamber when the piston is in its retracted position. By displacing the piston towards the brewing chamber, the inlet opening thereof is closed and the piston reduces the internal volume of the brewing chamber while being displaced into its interior, thereby exerting a preset pressure on the coffee powder contained in the brewing chamber. Finally, a preset amount of hot water is fed into the brewing chamber and forced to pass through the compressed coffee powder whereby the resulting coffee beverage is collected.

2. Prior Art

The above described method is well known in the art and a plurality of coffee brewing apparatuses exists which are operated according to this method. Examples thereof are disclosed in the Patent Publication No. PCT-WO 82/01120 and in the German Laid Open Publication No. 20 53 466. The general objects to be met thereby are to prepare an aromatic coffee beverage, to efficiently exploit the coffee powder, to avoid the need to perform a plurality of manual operation steps, and to prepare the coffee beverage in different quantities (one cup or two cups simultaneously).

Methods of coffee preparation known in the art usually base on the generally correct assumption that, for the preparation of e.g. one cup of coffee, a preselected amount of coffee powder has to be filled into the brewing chamber, a preselected pressure has to be exerted on the coffee powder in the brewing chamber, and a preselected amount of hot water has to pass the compressed coffee powder. Known coffee brewing apparatuses operating more or less automatically perform this method usually as follows:

1. A coffee bean milling assembly is operated during a certain time period to produce a certain amount of coffee powder, the exact amount being dependent of the time the mill is operated.

2. The (theoretically known and constant) amount of coffee powder thus produced is filled into the brewing chamber which has a known internal volume.

3. A piston is moved into the brewing chamber in order to close it, whereby the displacement path is calculated from the known internal volume of the brewing chamber and the (theoretically known) amount of coffee powder contained therein, in an attempt to compact the coffee powder by exerting a preselected pressure.

4. A preselected amount of brewing water is forced through the compacted coffee powder cake contained in the brewing chamber and the beverage thus produced is collected.

In practice, however, some serious and disadvantageous problems occur:

A constant milling time period of the coffee beans must not unconditionally result in a constant amount of coffee powder. The relation between the milling time period and the resulting amount of coffee powder depends, amongst else, from the kind and quality of the coffee beans used, from the operational condition of the milling assembly (wear etc.) and from fluctuations of the mains supply voltage.

A constant displacement path of the piston must not unconditionally result in a constant pressure on the coffee powder in the brewing chamber with a preselected pressure force. This is particularly true if the amount of coffee powder delivered by the milling assembly varies due to the above mentioned reasons. Furthermore, the preselected displacement path is only theoretically "constant"; in fact, significant deviations from the preselected value may occur due to irregularities in the driving means, wear thereof etc.

The milling rate of the coffee powder, i.e. the fineness or grain size thereof is not taken into account in the methods known in the art. It is obvious that the grain size may unintentionally vary as well, e.g. depending of the kind and quality of the coffee beans, wear of the milling assembly etc. However, a fluctuation in grain size is immediately reflected in an impairment of the quality of the coffee beverage.

The methods of preparing coffee which are well known in the art thus require, even if they are said to be automatically operating, significant expenditures as far as supervising, adjusting of the components of the apparatus, servicing and maintenance are concerned if no fluctuations or impairment of the coffee beverage quality is to be accepted.

OBJECTS OF THE INVENTION

It is a general object of the invention to provide a method for the preparation of coffee which avoids the aforementioned drawbacks and which is self-regulating, thus operates really automatically.

It is a further object of the invention to provide a method which ensures always a constant high quality of the coffee beverage independently of fluctuations in coffee bean consistency, operational tolerances of the apparatus and increasing wear of the components thereof.

Particularly, it is an object of the invention to provide a method which automatically compensates any deviations from preset operation parameters thereby enabling the apparatus to prepare a coffee beverage with a constant high quality.

SUMMARY OF THE INVENTION

According to a first aspect of the invention, these and other objects are met with an improved method of the kind described hereinabove, the improvement comprising the steps of, in a first coffee preparation cycle, filling a preset amount of coffee powder into the brewing chamber and measuring the displacement path of the piston required to exert a preselected pressure on the coffee powder in the brewing chamber, comparing said measured value of the displacement path with a reference value of the displacement path, and altering the amount of coffee powder filled into the brewing chamber in one of the subsequent coffee preparation cycles if the deviation of the measured value of the displacement path from the reference value of the displacement path exceeds a certain threshold value.

Thereby is achieved that one of the most important conditions for the preparation of a high quality coffee beverage, namely the correct pressure on the coffee powder in the brewing chamber, is met prior to scalding the coffee powder. Theoretically, the correct pressure exerted by the piston on the coffee powder in the brewing chamber must be attained after the piston has performed a precalculated displacement path which dependends of the amount of coffee powder which was filled into the brewing chamber. However, in practice, this is not always true. If this is not the case, maybe because the amount of coffee powder filled into the brewing chamber is too small or too large, maybe because the piston has been displaced along a path different from the precalculated path, the length of the real displacement path of the piston is corrected such that the desired pressure is exerted on the coffee powder in the brewing chamber. The real value of the length of the displacement path is thereby compared with a reference value and the result is a deviation value. If the deviation value thus obtained is but very small, the measurement is ignored and does not have any further influence to the further process steps. If, however, the deviation value exceeds a certain threshold, the deviation value is stored.

If it is recognized during subsequent preparation cycles that a similar deviation exceeding the aforementioned threshold value occurs recurrently, the amount of the coffee powder filled into the brewing chamber is altered in order to obtain the precalculated displacement path of the piston as accurately as possible.

According to a second aspect of the invention, the above and other objects are met with an improved method of the kind described hereinabove, the improvement comprising the steps of, in a first coffee preparation cycle, passing a preset amount of brewing water through the brewing chamber and measuring the time required by the brewing water to pass through the coffee powder in the brewing chamber, comparing said measured value of time with a reference value of the passing time, and altering the milling rate of the coffee powder filled into the brewing chamber in one of the subsequent coffee preparation cycles if the deviation of the measured value of the passing time from the reference value of the passing time exceeds a certain threshold value.

Thereby is achieved that a further important condition for the preparation of a high quality coffee beverage is met, namely the correct milling rate or average grain size of the coffee powder to be filled into the brewing chamber. On the base of a preset amount of brewing water required for a high quality coffee beverage, the theoretically optimal time can be calculated in which the brewing water has to pass the compressed coffee powder in the brewing chamber. During the scalding operation, i.e. during the period in which the brewing water passes through the compressed coffee powder in the brewing chamber, the time is measured and then compared with the calculated reference time. A significant deviation in the positive sense means that the coffee powder was milled too finely; thus the milling rate is adjusted to mill the beans coarser in one of the subsequent coffee preparation cycles. Accordingly, if a negative deviation is recognized, the coffee powder was milled too coarsely and the milling rate is adjusted to mill the beans finer in one of the subsequent coffee preparation cycles.

According to a third aspect of the invention, the above and other objects are met with an improved method of the kind described hereinabove, the improvement comprising the steps of, in a first coffee preparation cycle, filling a preset amount of coffee powder into the brewing chamber and measuring the displacement path of the piston required to exert a preselected pressure on the coffee powder in the brewing chamber, comparing said measured value of the displacement path with a reference value of the displacement path, passing a preset amount of brewing water through the brewing chamber and measuring the time required by the brewing water to pass through the coffee powder in the brewing chamber, comparing said measured value of time with a reference value of the passing time, and altering the amount of the coffee powder filled into the brewing chamber as well as the milling rate of the coffee powder filled into the brewing chamber in one of the subsequent coffee preparation cycles if the deviation of the measured values of displacement path and of the passing time from the reference values of the displacement path and of the passing time exceed certain threshold values.

Usually it is not advisable to perform these alterations, either of the amount of coffee powder or of the milling rate or both, as soon as a minor deviation from the reference value is detected. Thus, in a preferred embodiment of the method according to the invention, these alterations are caused only if a deviation of more than e.g. plus or minus 10% from the reference value is detected.

Furthermore, it is recommended to perform these alterations not in the subsequent preparation cycle, since the measured deviation or deviations could be isolated irregularities which probably do not repeat. Only if the same or similar deviations are recurrently detected in a number of subsequent preparation cycles, for instance in three, four, five or six cycles, the alterations of the amount and/or of the milling rate of the coffee powder is caused.

DESCRIPTION OF A PREFERRED EMBODIMENT

Figure 1:
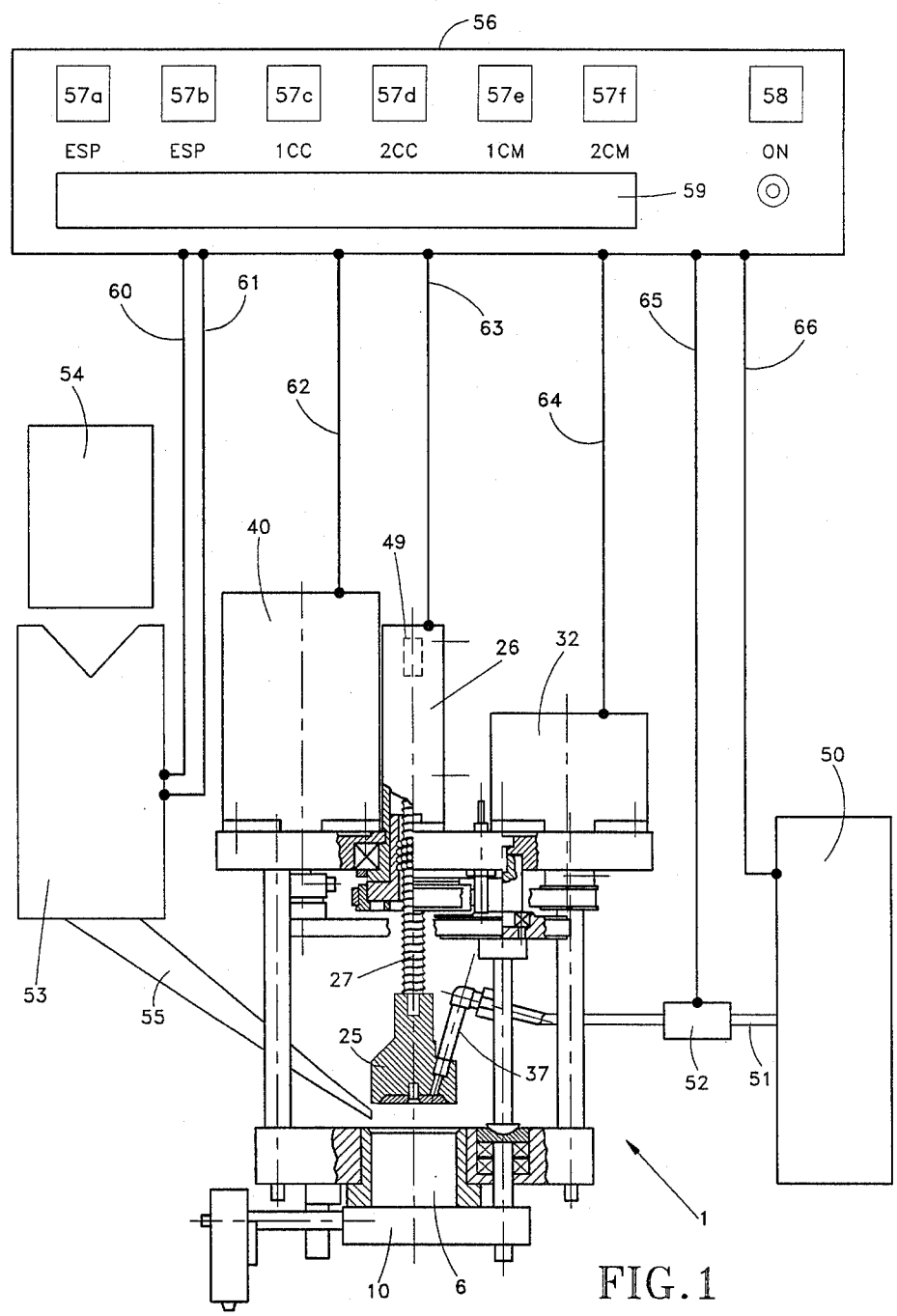
Figure 2:
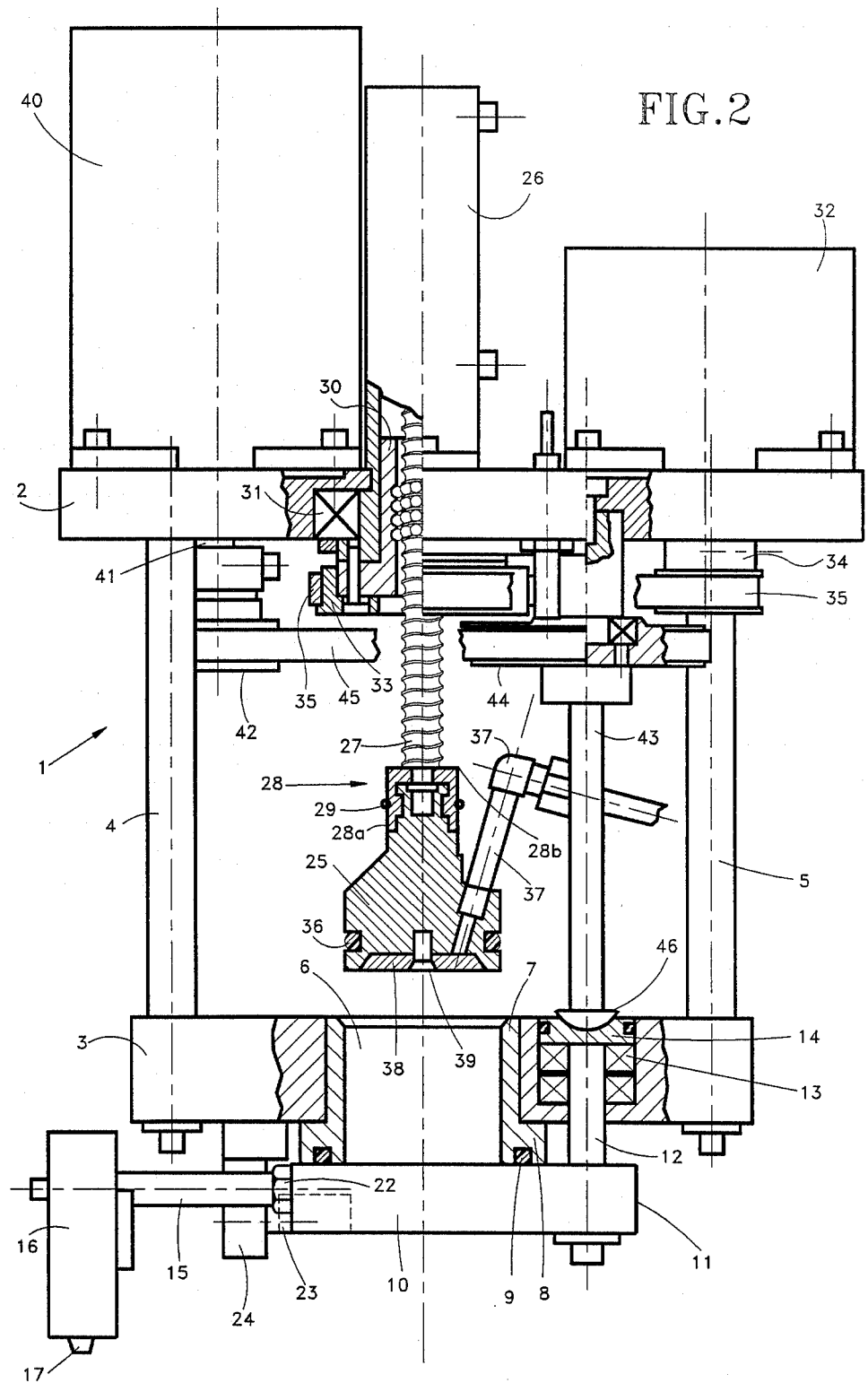
Figure 3:
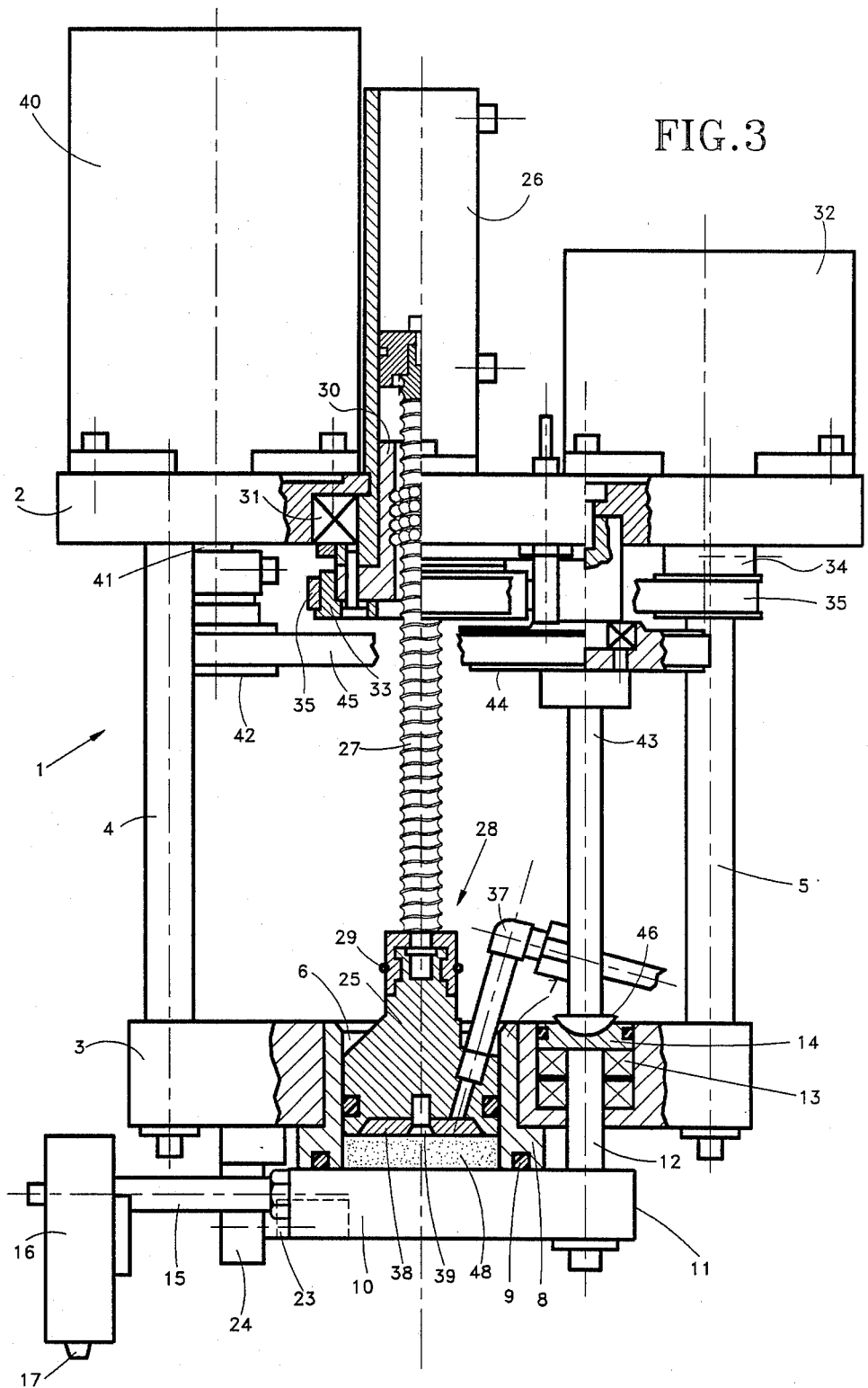

In the following description, the metohd according to the invention will be further explained, with reference to the accompanying drawings, in which the relevant parts and components of an embodiment of a coffee brewing apparatus are shown. In the drawings, FIG. 1 shows a diagrammatic view of some important parts and components of a coffee brewing apparatus suitable to operate according to the method of the present invention;

FIG. 2 shows a partly sectioned schematic side view of the piston group of the apparatus according to FIG. 1 in a first operation cycle; and FIG. 3 shows a partly sectioned schematic side view of the piston group of the apparatus according to FIG. 1 in a second operation cycle.

In the following description, in a first section, the coffee brewing apparatus partly shown in the drawings will be further explained, and subsequently, in a second section, the method according to the invention will be fully explained with reference to this coffee brewing apparatus. It is thereby understood that only some relevant parts and components of the coffee brewing apparatus are shown and discussed; other parts which are also necessary for a proper operation of the apparatus are omitted since it will be clearly obvious for any person skilled in the art what further parts and components have to be provided and how they are to be arranged and interconnected. It is further understood that the method according to the present invention operates equally well with an apparatus more or less different from the apparatus described here as a preferred embodiment.

The essential components of a coffee brewing apparatus are schematically shown in FIG. 1. The heart of the coffee brewing apparatus is a piston-cylinder-assembly 1; the exact design thereof will be discussed hereinafter with reference to FIGS. 2 and 3. Amongst else, the piston-cylinder-assembly 1 includes a brewing chamber 6 adapted to receive the coffee powder to be scalded, the lower end thereof being sealingly closeable by means of a closing member 10. A piston 25 slidably mounted above the brewing chamber 6 may be lowered and displaced into the interior of the brewing chamber 6 in order to close it and to compact the coffee powder filled into the brewing chamber 6. The piston 25 is driven by a stepping motor 32 connected to the piston 25 by means of a piston rod 27 of a ball screw drive gear received in a bearing means 26 which includes a pressure sensor member 49 shown by dashed lines in FIG. 1 and adapted to measure the pressure exerted by the front face of the piston 25 to the coffee powder contained in the brewing chamber 6. To open and close the bottom side of the brewing chamber 6, the closing member 10 is driven by a further stepping motor 40 to a pivotal movement.

Furthermore, the coffee brewing apparatus comprises a hot water supply assembly 50 which serves to provide the water necessary for scalding the coffee powder contained in the brewing chamber 6. The hot water supply assembly 50 is connected to the brewing water inlet 37 of the piston 25 by means of a pipe 51 in which a flow rate detector member 52 is inserted. A coffee bean milling assembly 53 including a reservoir 54 for coffee beans is adapted to mill the coffee beans to coffee powder with selectable average grain size and connected to the piston-cylinder-assembly 1 by means of a feeding channel 55 such that the milled coffee powder flows from the milling assembly 53 into the brewing chamber 6 if the piston 25 is in its uppermost rest position.

Finally, a control unit, generally designated with reference numeral 56, is provided which controls the operation of the coffee brewing apparatus. The design and construction of the control unit 56 need not to be further explained since such units are well known and commercially available and a person skilled in the art will obviously be in a position to choose a suitable unit. Preferably, a suitable adapted and programmed microprocessor control unit appears to be a good choice. In the present example, the control unit 56 comprises six program keys 57a and 57f adapted to enter the desired kind and amount of coffee beverage to be prepared by the coffee brewing apparatus, an execute key 58 adapted to start a coffee beverage preparation cycle, and an indicator field 59 adapted to display e.g. an error message.

The control unit 56 is connected to the components of the coffee brewing apparatus as follows:
Via a line 60 to the coffee bean milling assembly 53 to switch it on and off;
Via a line 61 to the coffee bean milling assembly 53 to adjust the degree of milling of the coffee beans;
Via a line 62 to the stepping motor 40;
Via a line 63 to the pressure sensor member 49;
Via a line 64 to the stepping motor 32;
Via a line 65 to the flow rate detector member 52;
Via a line 66 to the hot water supply assembly 50.

Referring now to FIGS. 2 and 3, the detailed design and construction of the piston-cylinder-assembly 1 will be further explained. It is shown in the drawings in partly sectioned side views in two different operation cycles.

The piston-cylinder-assembly 1 comprises a first upper base plate member 2 and a second lower base plate member 3 rigidly connected to each other by means of several connecting columns 4 and 5, only two thereof being shown in the drawings, in distant and parallel relationship. The second lower base plate member 3 includes a cylindric cavity which serves as the brewing chamber 6. In the present example, the brewing chamber 6 may be constituted by the interior of a hollow cylindric sleeve 7 inserted into the second lower base plate member 3 and manufactured e.g. of stainless steel. The upper end of the sleeve 7 flushes with the upper surface of the lower base plate member 3, and the lower end of the sleeve 7 comprises an annular flange 8 of increased diameter projecting from the lower surface of the second lower base plate member 3. The freely exposed front face of the flange 8 comprises an annular groove into which an annular sealing member 9, e.g. manufacture of rubber or plastic, is inserted.

Furthermore, the second lower base plate member 3 serves to support a closing member 10 of essentially plate like shape comprising an eccentrically, i.e. closely to the edge 11 mounted shaft 12 which projects upwardly and the free end thereof being received in a bearing assembly 13. The bearing assembly 13 may include, for instance, two ball bearings which are inserted in a opening 14 in the second lower base plate member 3. The opening 14 is located besides the sleeve 7 whereby the central axis of the opening 14 and thereby the rotation axis of the bearing assembly 13 extends parallely to the central axis of the sleeve 7. The distance between the closing member 10 and the second lower base plate member 3 is choosen such that the upper surface of the closing member 10 rests on the freely exposed frontal face of the flange 8 of the sleeve 7. If the closing member 10 is in its closed position as shown in the drawings, the lower end of the brewing chamber 6 is closed and the brewing chamber 6 is sealed against any leakage by means of the annular sealing member 9.

A beverage outlet head 16 incorporating two beverage outlet openings 17 is mounted on the closing member 10 by means of a interconnecting pipe 15 flanged to the side of the closing element 10 opposite to the side to which the shaft 12 is connected. The outlet openings 17 are connected to a annular channel at the top of the closing member 10 via internal channels, the annular channel being in the shape of a groove and covered by a micro mesh member. All these last mentioned details are not shown in the drawings since they are not essential in the present invention.

Furthermore, locking means are provided at the second lower base plate member 3 and at the closing member 10 which prevent the closing member 10, when it is in its closed position, from any displacement in the direction of the central axis of the brewing chamber 6. In the embodiment shown in the drawings, the locking means include a locking web 22 radially projecting from the closing member 10 and situated diametrally opposite to the shaft 12. The locking web 22 cooperates with a protrusion 23 provided on a web 24 which projects from the second lower base plate member 3 downwardly. Upon rotating the closing element 10 around the shaft 12 into the closing position, the lower side of the web 22 engages the upper side of the protrusion 23. Preferably, the lower side of the web 22 and/or the upper side of the protrusion 23 may be slightly inclined in order to provide a pressure force exerted by the closing member 10 towards the lower face of the sleeve 7 and thereby on the annular sealing member 9 when it is rotated along the last portion of its rotation path to reliably seal the brewing chamber 6.

The piston 25 is height-adjustably mounted on the first upper bse plate member 2. For that purpose, the upper surface of the first upper base plate member 2 bears a guiding and bearing assembly 26 adapted to receive a ball spindle 27 which receives at its lower free end the piston 25. In the interior of this guiding and bearing assembly 26, the pressure sensor member 49 is mounted which measures the pressure exerted by the piston 25 on the coffee powder cake 48 if the piston 25 is in the position shown in FIG. 3.

The piston 25 is mounted on the free end of the spindle 27 by means of a releasable coupling member 28 including two essentially semicylindric coupling shells 28a and 28b. The latter ones engage annular webs and annular grooves, respectively, not further designated and provided at the end of the spindle 28 as well as at the top of the piston 25. For this purpose, the inner surfaces of the two shells 28a and 28b are provided with correspondingly shaped annular grooves and annular webs to establish a positive connection of the piston 25 to the spindle 28. To hold the two shells 28a and 28b together, an elastically resilient clamping member, e.g. a rubber ring 29 is provided.

The displacement of the spindle 27 and thereby of the piston 25 regarding their height is performed by means of a ball screw sleeve 30 rotatably but axially fixedly mounted, e.g. by means of a bearing 31, in the first upper base plate member 2. The design and construction of such a ball screw drive gear is well known in the art and need not to be further explained here. However, it is essential and must be pointed out, that a rotation of the ball screw sleeve 30 results in a essentially friction- and clearance-free displacement of the spindle 27 along the direction of its central axis.

The ball screw sleeve 30 is driven by a stepping motor 32 mounted on the first upper base plate member 2 as well. For this purpose, the ball screw sleeve 30 is provided with a pulley 33 rotationally fixedly mounted on the sleeve 30 and projecting over the lower surface of the first, upper base plate member, and the stepping motor 32 is provided with a pulley 34 projecting over the lower surface of the first upper base plate member 2 as well. The two pulleys 33 and 34 are coupled by means of a toothed belt 35 which ensures a transmission of the torque delivered by the stepping motor 32 to the ball screw sleeve 30 essentially without clearance and slip.

The position of the bearing assembly 26 for the piston 25 is such that the central longitudinal axis of the piston 25 coincides with the central longitudinal axis of the brewing chamber 6. Starting from the upper rest position of the piston 25 shown in FIG. 2, an operation of the stepping motor 32, the correct sense of rotation supposed, will cause that the piston 25 is lowered towards the brewing chamber 6 and finally enters the interior thereof. The outer diameter of the piston 25 corresponds essentially to the inner diameter of the sleeve 7 constituting the brewing chamber 6, a slight clearance being provided, of course, whereby a annular sealing member 36 mounted in a circumferential groove of the piston 25 serves to seal the interior of the brewing chamber 6 once the piston 25 has entered the chamber 6.

Furthermore, the piston 25 is provided with a brewing water connector member 37 which is connected to the hot water supply assembly 50 shown in FIG. 1. The brewing water connector member 37 merges in a dispensing member 38 mounted in the interior of the piston 25 which provides for a delivery of the brewing water equally distributed around the front face of the piston 25. Preferably, the dispensing member 38 is easily releasably connected to the piston 25, e.g. by means of a screw 39, in order to facilitate a cleaning thereof.

To drive the closing member 10 to a pivotal motion, a further stepping motor 40 is provided, mounted on the first upper base plate member 2 as well. The drive shaft 41 of the stepping motor 40 projects through an opening in the base plate member 2 downwardly and bears a pulley 42 mounted on its end. A drive shaft 43 is rotatably mounted on the first upper base plate member 2 and extends coaxially to the shaft 12 of the closing member 10. The drive shaft 43 is equipped with a pulley 44, and the pulleys 42 and 44 are coupled by means of a toothed belt 45. The lower end of the drive shaft 43 is connected to the rotatably mounted shaft 12 of the closing element 10 by means of a coupling member 46 in order to enable the closing member 10 to be pivoted by the operation of the stepping motor 40.

Prior to explain the method of the present invention in detail, the assumptions and prerequisites of the examples to be discussed hereinafter shall be particularized. It is understood that other conditions may be given in certain cases, but this does not change the basic principle of the method according to the invention in any way.

The apparatus discussed in this paper is used to prepare six different coffee beverages with regard to quantity and quality. For this purpose, the control unit 56 has six program keys 57a to 57f. To each coffee beverage preparation program, different reference parameters are related which are set forth in the following Table 1.

TABLE 1

|  | 1 Esp. | 2 Esp. | 1 CC | 2 CC | 1 CM | 2 CM |
| --- | --- | --- | --- | --- | --- | --- |
| Coffee powder (grams) | 9 | 16 | 8 | 14 | 7 | 12 |
| Number of steps | 1556 | 1400 | 1578 | 1444 | 1600 | 1488 |
| Exerted pressure (kp) | 80 | 50 | 60 | 30 | 50 | 25 |
| Hot water (cm$^3$) | 70 | 140 | 150 | 300 | 120 | 240 |
| Passing time (sec.) | 15 | 25 | 20 | 30 | 15 | 25 |

In the above Table 1, the meaning of the abbreviations is as follows:
1 Esp.: 1 cup of Espresso (strong Italian coffee)
2 Esp.: 2 cups of Espresso 1 CC: 1 cup of coffee with cream
2 CC: 2 cups of coffee with cream
1 CM: 1 cup of coffee with milk
2 CM: 2 cups of coffee with milk
Number of steps: The number of steps the stepping motor 32 performs in one cycle, starting from the upper rest position of the piston.

As can be seen from the above Table 1, a specific group of reference parameters is related to each kind and amount of beverage. These parameters initially entered into the control unit and stored therein are based on ideal operating conditions, i.e. the coffee brewing apparatus is new and has no signs of wear, a certain coffee brand and/or quality is used, the mains power supply has its nominal voltage etc. These conditions, however, are not always fulfilled in practice, and at this point the present invention engages.

The following examples are based on the assumption that the coffee brewing apparatus, particularly the control unit 56, has been programmed in the factory at nominal mains voltage and using a certain coffee bean brand. Furthermore, it is understood, that the examples to be discussed hereinafter are applicable to all sorts and amounts of coffee beverages with correspondingly altered parameters.

EXAMPLE 1

A cup of coffee with cream has to be prepared. Thus, the program key 57c and subsequently the execute key 58 is operated. The control unit 56 causes the coffee bean milling assembly via line 60 to operate during a preset period of time to produce 8 grams of coffee powder from coffee beans supplied from the reservoir 54 and to discharge the coffee powder via the feeding channel 55 into the brewing chamber 6. Now the stepping motor 32 is operated via line 62 to perform 1578 steps. Simultaneously, via line 63, the pressure exerted to the coffee powder 48 in the brewing chamber 6 is measured. After 1578 steps performed by the stepping motor 32 the reference pressure of 60 kp is reached. Subsequently, the control unit 56 causes via line 66 a pump contained in the hot water supply assembly 50 to feed hot brewing water under pressure via pipe 51 into the brewing chamber 6. The amount of water flowing through the pipe 51 is continuously measured by the flow rate detector member 52 and the measurement value is transmitted to the control unit 56 via line 65. As soon as the reference amount of 150 cm$^3$ brewing water has flown through the member 52, the supply of further brewing water is interrupted. Simultaneously, the control unit 56 determines the time required by the 150 cm$^3$ of brewing water to pass through the detector member 52 and a time of 20 sec. has been measured. The control unit recognizes that everything is in best order; this removes the need to alter any of the operation parameters and a coffee beverage of good quality will be obtained.

EXAMPLE 2

A cup of coffee with cream has to be prepared. Thus, the program key 57c and subsequently the execute key 58 is operated. The control unit 56 causes the coffee bean milling assembly via line 60 to operate during a preset period to produce 8 grams of coffee powder from coffee beans supplied from the reservoir 54 and to discharge the coffee powder via the feeding channel 55 into the brewing chamber 6. Now the stepping motor 32 is operated via line 62 to perform 1578 steps. Simultaneously, via line 63, the pressure exerted to the coffee powder 48 in the brewing chamber 6 is measured. After 1578 steps performed by the stepping motor 32 the reference pressure of 60 kp is not yet reached. Consequently, the stepping motor 32 is further operated via line 62 until the reference pressure of 60 kp is reached. The number of steps in excess of 1578 to obtain the reference pressure is counted and stored in the control unit. Subsequently, the control unit 56 causes via line 66 a pump contained in the hot water supply assembly 50 to feed hot brewing water under pressure via pipe 51 into the brewing chamber 6. The amount of water flowing through the pipe 51 is continuously measured by the flow rate detector member 52 and the measurement value is transmitted to the control unit 56 via line 65. As soon as the reference amount of 150 cm$^3$ brewing water has flown through the detector member 52, the supply of further brewing water is interrupted. Simultaneously, the control unit 56 determines the time required by the 150 cm$^3$ of brewing water to pass through the detector member 52 and a time of 20 sec. has been measured. The control unit recognizes that the operation time of the coffee bean milling assembly 53 was not sufficient to produce the required amount of 8 grams of coffee powder because the piston 25 had to be displaced too much into the interior of the brewing chamber to exert the required pressure.

Depending of the fact whether the number of additional steps which were necessary to obtain the reference pressure of 60 kp has exceeded a certain threshold value or not, the control unit takes a note to prolong the operation time of the coffee mill in the subsequent preparation cycle or to wait with the prolongation of the operation time of the coffee mill until some more coffee preparation cycles have been run. In the first case, if the threshold value has been exceeded, the coffee bean milling assembly will be operated for a longer period in the subsequent preparation cycle in an approach to provide an adequate coffee quality. In the second case, however, if the threshold value has not been exceeded, one has to distinguish between two different states of malfunction:

It was an isolatedly occurring malfunction, e.g. of the coffee bean milling assembly 53 or during the discharge of the coffee powder by the channel 55; in the subsequent preparation cycle, everything is in best order again as in Example 1 and there is no need to alter any operation parameters.

It is a repeatedly and recurrently occurring malfunction; this is recognized if the malfunction e.g. according to Example 2 occurs again and again in the same or a similar degree in a number of subsequent preparation cycles.

In this second case, the occurrence of the malfunction is recorded in each preparation cycle, and if the same malfunction, e.g. a insufficient amount of coffee powder is delivered by the coffee mill, occurs three, four or five times, the control unit alters the reference parameter for the operation period of the coffee bean milling assembly 53 in a positive sense, i.e. the operation period of the milling assembly will be extended until the desired standard or reference conditions are met again.

It is understood that the same is correspondingly true if too much coffee powder is produced within the preset operation period of the milling assembly. In this case, the operation period of the milling assembly 53 is shortened to establish the standard or reference conditions.

Such malfunctions which are automatically compensated or removed by the method of the invention may occur due to using different brands or qualities of coffee beans, due to aging of or wear in the coffee mill, due to mains supply voltage fluctuations etc. An alteration of the parameters, however, is caused only if a preset threshold value is exceeded. In Example 2 for instance, if the stepping motor requires e.g. 1550 steps or e.g. 1610 steps instead of the preset 1578 steps to exert the reference pressure on the coffee powder in the brewing chamber, this would be considered as an acceptable standard deviation and, consequently, no alteration of the reference parameters will be caused. A reasonable deviation which would be acceptable could be, for instance, in the region of plus or minus 10% of the reference values.

EXAMPLE 3

A cup of coffee with cream has to be prepared. Thus, the program key 57c and subsequently the execute key 58 is operated. The control unit 56 causes the coffee bean milling assembly via line 60 to operate during a preset period of time to produce 8 grams of coffee powder from coffee beans supplied from the reservoir 54 and to discharge the coffee powder via the feeding channel 55 into the brewing chamber 6. Now the stepping motor 32 is operated via line 62 to perform 1578 steps. Simultaneously, via line 63, the pressure exerted to the coffee powder 48 in the brewing chamber 6 is measured. After 1578 steps performing by the stepping motor 32 the reference pressure of 60 kp is reached. Subsequently, the control unit 56 causes via line 66 a pump contained in the hot water supply assembly 50 to feed hot brewing water under pressure via pipe 51 into the brewing chamber 6. The amount of water flowing through the pipe 51 is continuously measured by the flow rate detector member 52 and the measurement value is transmitted to the control unit 56 via line 65. As soon as the reference amount of 150 cm$^3$ brewing water has flown through the member 52, the supply of further brewing water is interrupted. Simultaneously, the control unit 56 determines the time required by the 150 cm$^3$ of brewing water to pass through the detector member 52 and a time of 30 sec. has been measured. The control unit recognizes that too much time was needed to force the brewing water through the coffee powder contained in the brewing chamber 6 and takes a note that such malfunction possibly has to be corrected in one of the subsequent preparation cycles.

Usually the reason for this kind of malfunction is that the coffee powder has been milled to a too fine grain size. Accordingly, as explained hereinabove, the malfunction is noted. If it occurs only once, no alteration of the reference parameters is caused; if however the malfunction subsequently and recurrently occurs in the same or a similar degree, whereby a preset threshold value is exceeded, the milling rate of the coffee bean milling assembly 53 is altered via line 61 in order to produce coarser coffee powder. Again, such alteration may be caused only after e.g. the third, fourth or fifth preparation cycle, counted from the first occurrence.

In practice, of course, a combination of malfunctions may occur, e.g. a simultaneous occurrence of the malfunctions according to Example 2 and 3. Thus, in every days operation of the coffee brewing apparatus, it may be advantageous to combine the automatic correction mechanisms as hereinbefore isolatedly described. During the same preparation cycle, firstly the deviation of the length of the displacement path of the piston from the reference value and secondly the deviation of the passing time of the brewing water from the reference value is measured and recorded and, if appropriate, corrected in one of the subsequent preparation cycles. It depends of the individual situation how this correction is caused in detail. For instance, an incorrect milling rate may be corrected e.g. already in the third or fourth preparation cycle after the first occurrence of this kind of malfunction, whilst an incorrect amount of coffee powder delivered to the brewing chamber may be corrected e.g. only in the fourth or fifth preparation cycle after the first occurrence of that kind of malfunction. With other words, the two regulation loops may operate independently from each other.

If really significant deviations from the reference values are detected, i.e. if the detected deviation of a parameter from the reference parameter exceeds a certain error threshold value, the indicator field 59 displays an error message and the preparation cycle is interrupted. For instance, it is possible that the coffee bean milling assembly 53 delivers only a very small amount or even no coffee powder at all, or that the stepping motor 32 needs an unproportionally large number of steps to reach the required reference pressure or doesn't it reach at all; then the display 59 shows for example "COFFEE MILL DEFECTIVE" or "RESERVOIR EMPTY". If on the other hand the hot water supply assembly 50 does not work properly, i.e. if the flow rate detector member 52 is not able to register the required amount of brewing water having passed even after an unproportionally long time, the display 59 shows for example "WATER TANK EMPTY" or "PUMP DEFECTIVE".

The essential basic idea of the invention is that malfunctions which occur only isolatedly or very seldom and deviations which are very small are ignored, while malfunctions which repeatedly and recurrently occur and which exceed a preset threshold value, e.g. due to wear of the components of the apparatus, fluctuations in mains supply voltage, different coffee bean quality etc, are recognized, noted and automatically corrected. Thus, a reduced expenditure in maintenance and servicing as well as an always constant beverage quality is ensured.

While the invention has been explained in relation to its preferred embodiments, it is to be understood that various modifications thereof will become apparent to those skilled in the art upon reading this specification. Therefore, it is to be understood that the invention disclosed herein is intended to cover such modifications as fall within the scope of the appended claims.

What I claim is:

1. A method of preparing coffee comprising cyclically repeated steps of:
    feeding coffee beans to a coffee bean milling means;
    milling the coffee beans to a coffee powder having a selected average grain size;
    adding a selected amount of the coffee powder into a brewing chamber;
    displacing a piston into the interior of the brewing chamber and thereby reducing the internal volume of the brewing chamber containing the coffee powder until a preselected pressure is exerted on the coffee powder;
    supplying a preselected amount of hot water into the brewing chamber and forcing the hot water through the compressed coffee powder to prepare coffee;

collecting the prepared coffee;

measuring the length of the displacement path of the piston required to exert the preselected pressure on the coffee powder, and recording the measurement value in a microprocessor having a memory with a reference value stored therein and corresponding to the calculated length of the displacement path of the piston required to exert the preselected pressure on the coffee powder in the brewing chamber;

retrieving from the microprocessor memory the reference value stored therein;

comparing the measurement value and the reference value and generating a comparison signal; and altering the amount of coffee powder fed into the brewing chamber during a subsequent cycle in response to the magnitude of the comparison signal deviating from a predetermined magnitude.

2. A method according to claim 1 wherein the step of altering the amount of coffee powder fed into the brewing chamber is performed only if the magnitude of the comparison signal deviates from the predetermined magnitude by more than 10%.

3. A method according to claim 1 wherein the step of altering the amount of coffee fed into the brewing chamber is performed in the $N^{th}$ cycle of preparing coffee counted from a first cycle in which the predetermined deviation of the magnitude of the comparison signal from the predetermined magnitude was detected, upon deviation of the magnitude of the comparison signal from the predetermined magnitude in each cycle between the first and $N-1$ cycles, where N is an integer between 2 and 6.

4. A method according to claim 1 further comprising the step of interrupting a coffee preparation cycle and displaying an error message in response to the magnitude of the comparison signal deviating from the predetermined magnitude by a preset threshold amount.

5. A method according to claim 1 wherein the step of measuring the length of the displacement path of the piston comprises the step of measuring and recording the actual number of steps required by a stepping motor for displacing the piston to displace the piston the displacement path length required to achieve the preselected pressure on the coffee powder, and the step of comparing the measurement value and the reference value comprises the step of comparing the actual number of steps with a preset reference number of steps of the stepping motor.

6. A method of preparing coffee comprising cyclically repeated steps of:

feeding coffee beans to a coffee bean milling means;

milling the coffee beans to a coffee powder having a selected average grain size;

adding a selected amount of the coffee powder into a brewing chamber;

displacing a piston into the interior of the brewing chamber and thereby reducing the internal volume of the brewing chamber containing the coffee powder until a preselected pressure is exerted on the coffee powder;

supplying a preselected amount of hot water into the brewing chamber and forcing the hot water through the compressed coffee powder to prepare coffee;

collecting the prepared coffee;

measuring the length of the displacement path of the piston required to exert the preselected pressure on the coffee powder, and recording the length measurement value in a microprocessor having a memory with a length reference value stored therein and corresponding to the calculated length of the displacement path of the piston required to exert the preselected pressure on the coffee powder in the brewing chamber;

retrieving from the microprocessor memory the length reference value stored therein;

comparing the length measurement value and the length reference value and generating a length comparison signal;

altering the amount of coffee powder fed into the brewing chamber during a subsequent cycle in response to the magnitude of the length comparison signal deviating from a predetermined magnitude;

measuring the time required for the preselected amount of hot water to pass through the coffee powder in the brewing chamber and recording the time measurement value in the microprocessor having a time reference value corresponding to a calculated amount of time required for the preselected amount of hot water to pass through the coffee powder in the brewing chamber stored in the memory thereof;

retrieving from the microprocessor memory the time reference value stored therein;

comparing the time measurement value and the time reference value and generating a time comparison signal; and altering the degree of milling of the coffee means to thereby change the average grain size of the coffee powder fed into the brewing chamber in response to the magnitude of the time comparison signal deviating from a predetermined magnitude.

7. A method according to claim 6 wherein the step of altering the amount of coffee powder into the brewing chamber is performed only if the magnitude of the length comparison signal deviates from the predetermined magnitude by more than 10%.

8. A method according to claim 6 wherein the step of altering the amount of coffee fed into the brewing chamber is performed in the $N^{th}$ cycle of preparing coffee counted from a first cycle in which a predetermined deviation of the magnitude of the length comparison signal from the predetermined magnitude was detected, upon recurrent deviation of the magnitude of the length comparison signal from the predetermined magnitude in each cycle between first and $N-1$ cycles, where N is an integer between 2 and 6.

9. A method according to claim 6 wherein the step of altering the degree of milling is performed only if the magnitude of the time comparison signal deviates from the predetermined magnitude by more than 10%.

10. A method according to claim 6 wherein the step of altering the degree of milling is performed in the $N^{1th}$ cycle of preparing coffee counting from a first cycle in which a predetermined deviation of the magnitude of the time comparison signal from the predetermined magnitude was detected, upon recurrent deviation of the magnitude of the time comparison signal from the predetermined magnitude in each cycle between first and $N^1-1$ cycles, where $N^1$ is an integer between 2 and 6.

11. A method according to claim 6 further comprising the step of interrupting a coffee preparation cycle and displaying an error message in response to the magnitude of least one of the length and time comparison signals deviating from the predetermined magnitude by a preset threshold amount.

12. A method according to claim 6 wherein the deviation of the magnitude of the length comparison signal from a predetermined magnitude and the deviation of the magnitude of the time comparison signal from a predetermined magnitude is separately recorded in each coffee preparation cycle, and the number of recurrent occurrences of respective deviation values exceeding a predetermined magnitude is separately counted.

13. A method according to claim 6 wherein the step of altering the amount of coffee fed into the brewing chamber is performed in the $N^{th}$ cycle of preparing coffee counted from a first cycle in which a predetermined deviation of the magnitude of the length comparison signal from the predetermined magnitude was detected, upon recurrent deviation of the magnitude of the length comparison signal from the predetermined magnitude in each cycle between first and $N-1$ cycles, where N is an integer between 2 and 6, and the step of altering the degree of milling is performed in the $N^{1th}$ cycle of preparing coffee counting from a first cycle in which a predetermined deviation of the magnitude of the time comparison signal from the predetermined magnitude was detected, upon recurrent deviation of the magnitude of the time comparison signal from the predetermined magnitude in each cycle between first and $N^1-1$ cycles, wherein $N^1$ is an interger between 2 and 6, N being different from $N^1$.

14. A method according to claim 6 wherein the step of measuring the length of the displacement path of the piston comprises the step of measuring and recording the actual number of steps required by a stepping motor for displacing the piston to displace the piston the displacement path length required to achieve the preselected pressure on the coffee powder, and the step of comparing the measurement value and the reference value comprises the step of comparing the actual number of steps with a preset reference number of steps of the stepping motor.

* * * * *